March 31, 1942.    F. W. GODSEY, JR    2,277,968
ELECTRICAL CONDENSER
Filed July 16, 1940    2 Sheets-Sheet 1

FRANK W. GODSEY, JR.    INVENTOR.

BY Dorsey, Cole & Garner
ATTORNEYS.

March 31, 1942.  F. W. GODSEY, JR  2,277,968
ELECTRICAL CONDENSER
Filed July 16, 1940   2 Sheets-Sheet 2

FRANK W. GODSEY, JR. INVENTOR.

BY Dorsey, Cole & Garner
ATTORNEYS.

Patented Mar. 31, 1942

2,277,968

UNITED STATES PATENT OFFICE 2,277,968

ELECTRICAL CONDENSER

Frank W. Godsey, Jr., North Adams, Mass., assignor to Sprague Specialties Co., North Adams, Mass., a corporation of Massachusetts Application July 16, 1940, Serial No. 345,831

7 Claims. (Cl. 175—41.5)

The present invention relates to variable condensers and more particularly to a new and novel condenser tuning assembly embodying condensers of the type described in the copending application of Robert C. Sprague and Frank W. Godsey, Jr., Ser. No. 336,822, filed May 23, 1940.

Condensers described in said application comprise as their main elements two closely spaced concentric conducting cylinders which serve as the two electrodes of the condenser and which are displaceable relative to each other to vary the capacity of the condenser. Interposed between the electrodes is a dielectric layer which preferably consists of a vitreous material forming a fused integral coating on the surface of the inner electrode. Preferably, the electrodes and the coating are made to close tolerances in their coacting dimensions as to engage each other with a smoothly sliding fit.

Tuning condensers of this type have many advantages, as they combine a wide capacity range and great mechanical and electrical stability throughout their capacity range with a small size and a compact and light weight structure which can be manufactured at low cost.

Such tuning condensers possess inherently a linear capacity-stroke characteristic, but by means of suitable mechanical driving means the relationship between the capacity of the condenser and the displacement (or rotation) of the tuning control can be made of any other desired character.

To realize the full possibilities of such condensers, electrically, mechanically, and economically, particularly when the condensers are ganged for their simultaneous tuning, the assembly embodying same must itself be of high stability and at the same time, such assembly, must be simple, foolproof and of low cost.

Furthermore, such assembly must meet other important requirements. It must be such that without the need of absolute parallelism of the axes of the individual condensers and of a close tolerance positioning of the condensers within the assembly, no binding between the components of the condensers takes place. At the same time the assembly must be such that the corresponding electrodes of the individual condensers are immovable relative to each other which movement would preclude an accurate "tracking" of the condensers throughout their tuning range.

A further requirement of such an assembly is that it readily lend itself to diverse driving means for simultaneously varying the capacity of all the condenser units whereby any desired relationship between the capacity of the condensers and the displacement (or rotation) of the tuning control can be effected.

It is an object of the invention to provide a novel tuning condenser assembly comprising ganged condensers of the above described type, in which assembly the full inherent advantages of such condensers are realized.

A further object of the invention is to provide a novel condenser assembly which does not require a close tolerance positioning of the individual condensers within the assembly.

Another object of the invention is to provide a tuning condenser assembly which readily lends itself to various types of driving means for simultaneously varying the capacity of the condensers of the assembly.

These and further objects of the invention will appear as the specification progresses.

The novel tuning assembly of the invention will be described with reference to the appended drawings forming part of the specification and in which.

Figure 1:
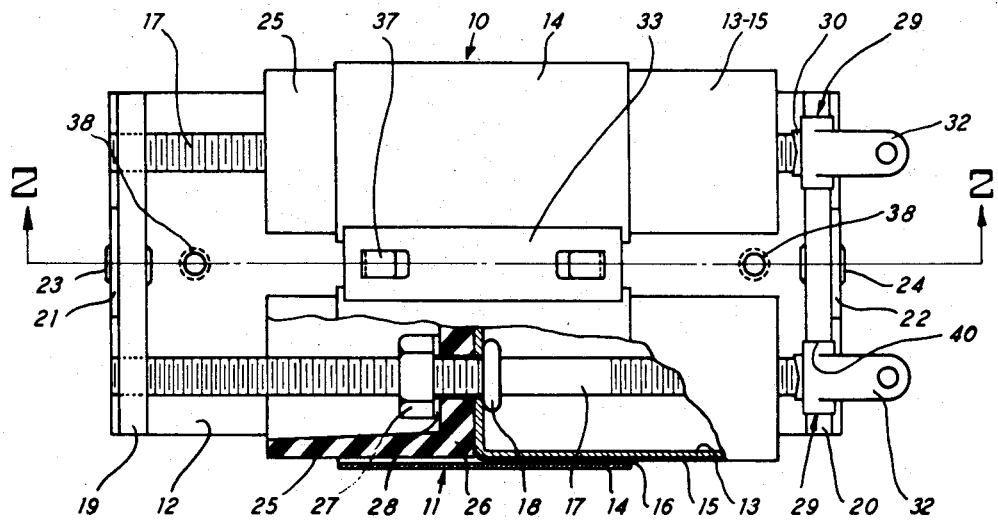
Figure 1 is a plan view partly in section illustrating the condenser assembly of the invention.
Figure 2:
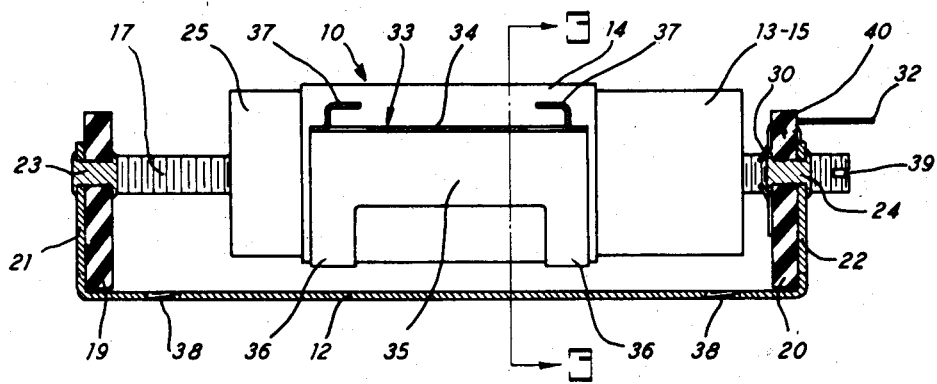
Fig. 2 is a side-view in section taken along the line 2—2 of Fig. 1.
Figure 3:
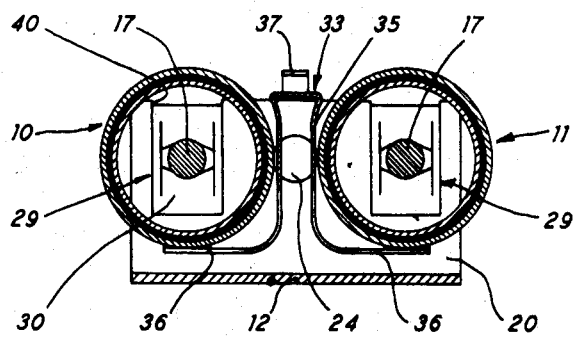
Fig. 3 is an end view in section taken along the line 3—3 of Fig. 2.

Referring to Figs. 1 to 3, the condenser assembly there shown comprises two condenser units 10 and 11 mounted in a manner later to be more fully described, on a base 12 consisting preferably of a sheet of hard metal, for example, of cold rolled steel. The base 12 is provided with tapped holes 38—38 adapted to receive suitable bolts (not shown) for mounting the tuning assembly.

Condensers 10 and 11 are of identical construction and each comprises as one electrode, a metal cylinder 13 and as the second electrode, a hollow metal cylinder or sleeve 14 concentrically surrounding the electrode 13. Electrodes 13 and 14 are displaceable relative to each other to vary the capacity of the condenser.

Interposed between the electrodes is a dielectric layer 15 forming an integral fused coating on the surface of electrode 13. The dielectric layer 15 consists preferably of a potassium-lead silicate vitreous enamel as disclosed in the copending application of Stanley O. Dorst, Ser. No. 289,292, filed August 9, 1939. The layer 15 may consist of other suitable dielectric materials, for example, of various kinds of vitreous enamels, or of non-vitreous dielectric materials such as cellulose acetate, polystyrene, hard rubber or the like, to which dielectric materials may be added a filler of titanium dioxide or other dielectric material to increase the dielectric constant and/or lower the power factor.

The layer 15 is applied to the electrode 13 preferably by the cataphoretic deposition process described in the copending application of Preston Robinson et al., Ser. No. 197,692, filed March 23, 1938, which process produces a coating of high uniformity and of even thickness throughout the length of the coating. As a rule, the so-deposited coating is fused and thereafter subjected to surface grinding as described in the above-referred to copending application of Robert C. Sprague et al. whereby the coated electrode 13—15 engages the sleeve electrode 14 with a smoothly sliding fit and an air layer or gap 16 having an average thickness of the order of .00025" to .0005" is formed between these elements.

For the guiding of the sleeve electrode 14 in its movement relative to the coated electrode 13—15, there is provided a guide 25 abutting against the closed end of electrode 13—15 and consisting of a low-loss insulating material such as "Bakelite," hard rubber, "Isolantite" or the like. Guide 25 is preferably hollow throughout its length except for the portion 26 abutting against the electrode 13—15. At their adjacent ends the electrode 13—15 and the guide 25 are provided with axial bores through which passes a spindle bolt 17 securing these members together by means of an integral shoulder 18 which abuts against the closed end of the electrode and a nut 27 which abuts against the portion 26 of the guide. A lock washer 28 is interposed between the nut 27 and the portion 26 to prevent loosening of nut 27 by vibration or other mechanical shock.

Each condenser is supported within the assembly by means of its spindle bolt 17 and two mounting strips 19 and 20 through suitable bores of which the projecting ends of bolt 17 pass as a snug fit. Strips 19 and 20 consist of an insulating material, for example, of hard rubber, "Bakelite" or the like, and are secured to the base 12 by rivets 23 and 24 respectively, passing through these members and mounting brackets 21—22 consisting of extending portions of the base 12.

To secure the bolt 17 within the mounting strips 19 and 20, the bolt is provided at its portion entering the strip 20, with a formed nut 29 consisting of a U shaped resilient metal strip straddling the mounting strip 20 and one arm 30 of which is threaded to receive the spindle bolt 17. Preferably, the strip 20 is notched at 40 to receive the nut 29.

For the outside electrical connection to each electrode 13—15 there is provided a terminal lug 32 consisting of an integral extending portion of the nut 29.

Tuning of the condenser assembly takes place by the simultaneous displacement of the sleeve electrodes 14 relative to the coated electrodes 13—15. For this purpose the sleeve electrodes are ganged together by a resilient metal yoke member which in accordance with the invention, on one hand permits unrestricted radial or transverse movement of the sleeves 14—14 relative to each other and on the other hand prevents lateral movement of the sleeves relative to each other.

The use of such a yoke member obviates the requirement of a close tolerance positioning of the condenser units within the assembly. Furthermore, by the use of such a yoke member the necessity of absolute parallelism between the axes of the coated electrodes it obviated, and the sleeve electrodes align themselves with the coated electrodes, thereby precluding any possibility of binding between these members throughout the entire movement of the sleeves.

While the sleeve electrodes are permitted substantially unrestricted radial or transverse movement relative to each other, they are at the same time precluded from any lateral movement relative to each other whereby no lost motion exists between these members and any preset "tracking" of the condensers of the assembly is maintained throughout the adjustment range of the condensers.

A yoke capable of so functioning is shown in Figs. 1 to 3 as 33 and comprises a substantially channel-shaped flexible metal strip, for example, of phosphor bronze, having a central portion 34, and side walls 35—35 each of which side walls extend into mounting arms 36—36 disposed substantially at right angles to the side walls. The arms 36 carry the sleeve electrodes 14—14 to which they are secured by soldering, welding or the like.

The condensers of the assembly are simultaneously adjusted by the lateral movement of the yoke 33 causing a corresponding movement of the sleeve electrodes 14 relative to the coated electrodes 13—15. For this purpose, the central portion 34 of the yoke is formed with two punched out ears 37—37 to which the two ends of a dial cord (not shown) are attached in known manner. Electrical connection to the sleeve electrodes 14—14 is provided through the yoke 33 which is maintained at ground potential by a suitable connection, for example, by the dial cord itself which consists preferably of a flexible wire or braid of bronze or the like.

Besides being simultaneously adjustable, the condensers of the assembly are also independently adjustable, whereby the capacities thereof can be either equalized or made to assume a constant difference throughout the adjustment range of the condensers. This is achieved by the lateral movement of the coated electrode 13—15 relative to the sleeve electrode 14 by turning the spindle bolt 17, for example, by means of a screw driver engaging its slotted end 39.

While in Figs. 1 to 3 a tuning assembly comprising only two condenser units is illustrated, it should be well understood that the invention is equally applicable to a tuning assembly comprising more than two condenser units, in which assembly each pair of adjacently disposed sleeves 14 are ganged together by a yoke 33 which permits unrestricted radial or transverse movement of the sleeve electrodes relative to each other, but which yoke restricts lateral movement of these elements relative to each other.

Figure 4:
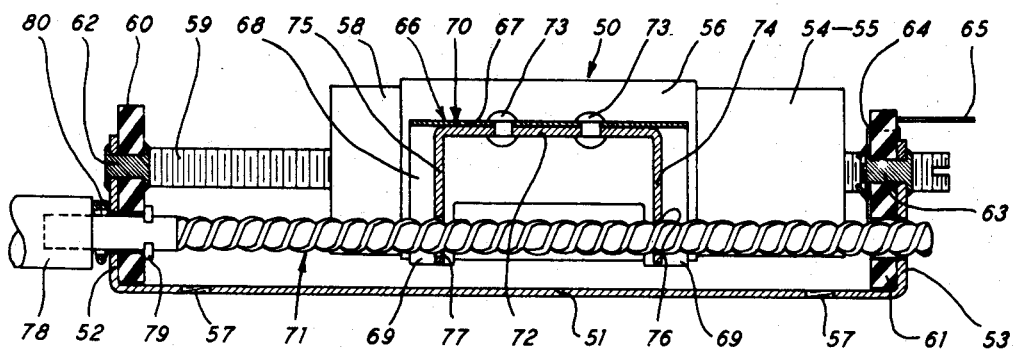
Fig. 4 is a side view in section similar to Fig. 2 and illustrates the assembly of the invention provided with a self-contained driving mechanism for simultaneously varying the capacity of the individual condensers.

In Fig. 4 there is shown the tuning assembly of the invention provided with a driving mechanism for the simultaneous adjustment of the individual condensers, which driving mechanism is wholly contained within the tuning assembly.

While in the tuning assembly of Fig. 4 only one condenser unit is shown, it should be well understood that the following description applies to an assembly comprising a plurality of condensers similarly as described in connection with Figs. 1 to 3.

The individual condensers making up the assembly of Fig. 4 are identical to those shown in Figs. 1 to 3 and the individual elements of the condensers need not again be described.

The assembly shown in Fig. 4 comprises individual condenser units 50 secured to a mounting base 51 consisting of a sheet of hard metal and comprising integral brackets 52 and 53 and tapped mounting holes 57—57. Each condenser comprises an inner cylindrical electrode 54, an outer concentric electrode 56 and a dielectric layer 55 forming an integral coating on the inner electrode 54. Abutting against the closed end of electrode 54 is a guide cylinder 58. The electrodes 54 and 56, the dielectric layer 55, and the guide 58, conform to the corresponding elements previously described in connection with Figs. 1 to 3.

Each condenser is supported within the assembly by a spindle bolt 59 and two insulating mounting strips 60 and 61 through suitable bores of which pass the ends of the bolt 59. The mounting strips 60—61 are secured to the base 51 by rivets 62 and 63 respectively, passing through the mounting strips and the mounting brackets 52 and 53.

To position the bolt 59 relative to the mounting strips 60—61, it is provided with a formed nut 64 consisting of a suitably shaped metal strip straddling the mounting strip 61. The nut 64 also extends into a terminal tab 65 for the external electrical connection to the coated electrode 54—55.

Each of the condensers is independently adjustable by the lateral movement of its coated electrode 54—55 relative to the sleeve electrode 56 by threading or unthreading the spindle bolt 59 through the nut 64 and the mounting strips 60 and 61.

For the simultaneous adjustment of the condensers the outer sleeve electrodes 56 are ganged together by a yoke 66 which in accordance with the invention permits unrestricted radial or transverse movement of the sleeve electrodes relative to each other and which at the same time prevents lateral movement of the sleeve electrodes relative to each other. The yoke 66 is similar to the yoke 33 of Figs. 1 to 3 and comprises a substantially channel-shaped resilient metal strip having a central portion 67 and side walls 68 each of which side walls extend into substantially perpendicularly disposed mounting arms 69—69 to which the sleeve electrodes 56 are secured by soldering, welding or the like. While the yoke 66 of Fig. 4 is shown to be identical to the yoke 33 of Figs. 1 to 3, it should be well understood that the invention includes yokes of other shapes which permit unrestricted radial or transverse movement of the sleeve electrodes relative to each other and which preclude lateral movement of the sleeves relative to each other.

For the lateral movement of the yoke 66 and the simultaneous adjustment of the capacity of the condensers there is provided a driving mechanism consisting of a travelling nut 70 affixed to the yoke 66 and a lead screw 71. As shown the nut 70 comprises a channel shaped rigid metal strip comprising a central portion 72 secured to the yoke 66 by rivets 73—73, an arm 74 having a threaded bore 76 engaging the threads of the lead screw 71, and an arm 75 with a bore 77 for guiding the nut 70 on the lead screw.

The lead screw 71 is supported within the tuning assembly by means of the brackets 52 and 53 through suitable bores of which members pass the ends of the lead screw preferably with a close bearing fit. The unthreaded end of lead screw 71 protruding beyond the strip 60 is provided with a shaft 78 for receiving a suitable tuning knob (not shown), the lead screw being secured within the shaft 78 as by a forced fit.

The lead screw is locked within the assembly by means of a split locking collar 79 which engages an annular slot in the unthreaded portion of the lead screw and abuts against the strip 60.

To prevent its lateral movement, the lead screw 71 is provided with a helical spring 80 surrounding its protruding portion which spring abuts with its ends against the end face of the shaft 78 and the mounting flange 52.

In Fig. 4 a lead screw 71 having a uniform pitch is illustrated whereby the capacity of the condensers varies linearly with rotation of the control shaft 78, however, it is to be noted that other relationships between capacity of the condensers and the rotation of the shaft can be readily achieved. For example, where a straight line frequency characteristic is desired, this is achieved by the use of a lead screw 71 the threads of which have a uniformly varying pitch.

While I have described my invention by means of specific examples and in specific embodiments, I do not wish to be limited thereto for obvious modifications will occur to those skilled in the art without departing from the spirit and scope of the invention.

What I claim is:

1. An adjustable condenser assembly comprising a mounting base and two condenser units disposed on said base, each of said units comprising two concentric cylindrical electrodes adapted to be laterally moved relative to each other and a dielectric layer interposed between the electrodes and forming an integral concentric coating on one electrode, insulating mounting strips secured to two opposing ends of said base, a threaded member engaging the inner electrode and threadingly engaging one of said insulating strips, a member securing together the outer electrodes of said condensers, said member permitting transverse movement of the outer electrodes and precluding lateral movement thereof relative to each other, said outer electrodes adapted to be simultaneously laterally moved relative to the inner electrodes to simultaneously vary the capacity of the condensers, said inner electrodes adapted to be independently laterally moved relative to the outer electrodes to independently adjust the capacity of each condenser.

2. An adjustable condenser assembly comprising a mounting base and two condenser units disposed on said base, each of said condensers comprising two concentric cylindrical electrodes adapted to be laterally moved relative to each other and a dielectric layer interposed between the electrodes and forming an integral concentric coating on the surface of one electrode, the inner electrode of each condenser rigidly secured to said mounting base, a resilient channel member with offset arm portions interposed between the outer electrodes of said condensers, said electrodes secured to the arms of said channel member, means to simultaneously vary the capacity of said condensers, said means comprising a driving member adapted to laterally move said channel member.

3. An adjustable condenser assembly comprising a mounting base and two condenser units disposed on said base, each of said condensers comprising two concentric cylindrical electrodes adapted to be laterally moved relative to each other and a dielectric layer interposed between the electrodes and forming an integral concentric coating on the surface of one electrode, the inner electrode of each condenser rigidly secured to said mounting base, a resilient channel member with offset arm portions interposed between the outer electrodes of said condensers, said electrodes secured to the arms of said channel member, means to simultaneously vary the capacity of said condensers, said means comprising a lead screw disposed within the tuning assembly and engaging said channel member.

4. An adjustable condenser assembly comprising a base and two adjacently disposed condenser units on said base, each of said condensers comprising two concentric cylindrical electrodes adapted to be laterally moved relative to each other and a dielectric layer interposed between said electrodes and forming an integral concentric coating on the surface of one of said electrodes, an insulating mounting strip disposed on said base, a threaded member secured to the inner electrode of each condenser and securing same to said insulating strip, a resilient channel shape member securing together the outer electrodes of said condensers, said channel member permitting transverse movement of the outer electrodes and precluding lateral movement thereof relative to each other, means engaging said channel member to simultaneously vary the capacity of said condensers, the inner electrodes of said condensers independently adjustable relative to the outer electrodes by said threaded members.

5. An adjustable condenser assembly comprising a base and a plurality of adjacently disposed condenser units on said base, each of said units comprising two concentric cylindrical electrodes adapted to be laterally moved relative to each other and a dielectric layer interposed between said electrodes and forming an integral concentric coating on the surface of one of said electrodes, mounting strips disposed at two opposing ends of said base, the inner electrode of each condenser rigidly secured to said mounting strips, a member interposed between each pair of adjacently disposed outer electrodes and securing together said outer electrodes, said member permitting transverse movement of the outer electrodes and precluding lateral movement thereof relative to each other.

6. An adjustable condenser assembly comprising a mounting base and two condenser units on said base, each of said units comprising two concentric electrodes and a dielectric layer interposed between the electrodes, the inner electrode of each condenser secured to said base, a member securing together the outer electrodes of the condensers, said member being transversely flexible and permitting transverse movement of the outer electrodes relative to each other and being laterally rigid and precluding lateral movement of the outer electrodes relative to each other.

7. An adjustable condenser assembly comprising a mounting base and two condenser units on said base, each condenser comprising two cylindrical electrodes adapted to be laterally moved relative to each other and a dielectric layer interposed between the electrodes, the inner electrode of each condenser secured to the mounting base and the outer electrodes secured together by a member which is substantially rigid along an axis parallel to the longitudinal axis of the condensers and is substantially flexible along an axis perpendicular to the longitudinal axis of the condensers.

FRANK W. GODSEY, Jr.